United States Patent Office 2,861,970
Patented Nov. 25, 1958

2,861,970

COMPOSITIONS COMPRISING A POLYESTER AND TRICHLOROETHANOL AND PROCESS OF PREPARING SAME

Hobson D. De Witt, Decatur, Ala., assignor to The Chemstrand Corporation, Decatur, Ala., a corporation of Delaware No Drawing. Application March 23, 1955
Serial No. 496,342

14 Claims. (Cl. 260—31.2)

This invention relates to new compositions of matter, and more particularly, to new and useful compositions of matter comprising solutions or "dopes" of synthetic linear condensation polymers or polyesters. The invention is further concerned with new compositions of matter which are readily capable of being formed into useful shaped articles, such as films, fibers, filaments, bristles, foils, ribbons, and the like.

The synthetic linear condensation polyesters, which have become extremely valuable from a commercial standpoint, contemplated in the practice of the present invention are those formed from dibasic acids and glycols. When these polyesters are in a highly polymerized condition, they can be formed into filaments, and the like, which can be permanently oriented by cold-drawing. Specifically, the polyesters useful in the instant invention are those obtained by heating one or more glycols of the series $HO(CH_2)_nOH$, where $n$ is an integer greater than one but not exceeding 10, with a dibasic acid, such as terephthalic acid or an ester-forming derivative thereof.

Examples of the ester-forming derivatives of terephthalic acid are its aliphatic, including cycloaliphatic, and aryl esters and half esters, its acid halides and its ammonium and amine salts. Examples of the glycols are ethylene, trimethylene, tetramethylene, and decamethylene glycols. Various dibasic acids, other than terephthalic acid, may be employed, such as isophthalic acid, 4,4'-diphenyldicarboxylic acid, p-carboxyphenoxyacetic acid, succinic acid, etc. However, of all the polymeric esters, polyethylene terephthalate is preferred because of the ready availability of terephthalic acid and ethylene glycol, from which it is made, and also because of its high melting point which is about 240° C. The high melting point is particularly desirable in the manufacture of filaments for textile uses.

For the sake of simplicity of description, the present invention will be described as it is applicable to the use of the instant new compositions in the manufacture of filaments and fibers. The invention is not to be limited thereby but only in so far as the same may be limited by the appended claims.

Various methods are employed for converting the polyesters, described hereinbefore, into filaments and fibers, such as melt-spinning, dry-spinning and wet-spinning. The melt-spinning method has been most frequently employed comprising melting chips of the polyester on a heated grid, preferably passing the melt through a filter bed made up of a number of small particles, such as sand, forcing it through a spinneret and cooling the filaments so formed. However, melt-spinning has certain disadvantages. For example, high temperatures must be employed which makes the addition of plasticizers and other modifying agents difficult, since there is a tendency toward discoloration and decomposition of the added agent due to the high temperature.

The wet-spinning technique, wherein a solution of the polyester is extruded into a bath comprising a non-solvent for the polyester, has a number of advantages over the melt-spinning technique. For example, the wet-spinning method is generally more economical and can be operated at lower temperatures than melt-spinning. Because of the lower temperatures, plasticizers and other modifying agents can be more advantageously added to a solution rather than to a molten polyester, thereby minimizing the tendency toward discoloration and decomposition. Further, there is a tendency with certain types of plasticizers and modifying agents to be less compatible at the high temperatures required for blending in a melt, whereas they can be readily incorporated in a polyester solution at a low temperature. A still further advantage in the use of solutions lies in the ease with which they can be cast into films or coatings of uniform thickness, which is mechanically more difficult to accomplish with a molten composition due to its relatively high viscosity.

While, as pointed out above, the wet-spinning technique for forming shaped articles from polyesters is preferred, it has not been employed commercially due to the scarcity of solvents. Polyesters are generally insoluble in the more common organic solvents. There is a scarcity of solvents, which are suitable for the more usual types of polyesters, from the standpoints of non-corrosiveness, low-cost and solvent power, as well as from the standpoint of ease of recovery for reuse. Accordingly, a serious need has existed for the discovery of solvents with which polyester solutions of suitable concentration and stability can be prepared conveniently and economically with standard equipment, and with maximum safety both to personnel and to equipment, and which can readily and conveniently be recovered for reuse or re-cycling during the employment of the polyester solutions for transforming the polyesters into other forms, such as filaments, fibers, films, and the like.

Accordingly, the present invention has for its principal object, the preparation of polyester solutions or "dopes" which are capable of being transformed into shaped articles by the so-called wet-spinning method. Another object of the invention is to provide synthetic linear condensation polyester compositions which are stable and have non-gelation characteristics. Other objects and advantages of the instant invention will be apparent from the description thereof hereinafter.

The accomplishment of the foregoing objects is made possible by dissolving the synthetic linear condensation polyesters in trichloroethanol (B. P.=151° C.) or in mixtures of trichloroethanol and phenols, such as phenol, m-cresol, and the like, or halogen acids. The halogen acids contemplated in the practice of the present invention are the chloro- and bromo-substituted fatty acids containing from 2 to 4 carbon atoms, for example, monochloroacetic acid, α,β-dichloroacetic acid, mono-bromoacetic acid, mono-chloropropionic acid, dichlorobutyric acid, dibromopropionic acid, etc.

In most cases solutions of high solids content and good stability can be conveniently prepared by agitating the polyester or polymer with the trichloroethanol or mixture of trichloroethanol and phenol or halogen acid at a temperature in the range of 25° C. up to the boiling point of the solvent or solvent mixture.

When dissolving a polyester in a solvent mixture the trichloroethanol may be employed in the range of 50 to 98%, based on the weight of the total solvent, and the phenol or halogen acid in the range of 2 to 50%.

In accordance with the present invention, solutions or "dopes" containing from 5 to 30% by weight of polyester are suitable for the formation of fibers and filaments. The concentration of the polyesters which can be obtained in solution and the viscosity of the solution depend upon the nature of the polymer, the solvent employed and the temperature. Usually, when making a solution of a polyester which is to be employed in the manufacture of filaments and fibers, a polyester having a molecular weight of at least 10,000 is employed. Lower molecular weight polyesters may be employed when the solution or dope is to be used for coating or as a lacquer. While it is preferred to employ 5 to 30% by weight of polyester in the solution when forming fibers or filaments, it is to be understood that less than 5% or more than 30% polyester may be used when the solution is to be employed for other purposes, such as in coating, or in lacquers, and the like, or when polyesters having a molecular weight below 10,000 are employed.

The polyesters contemplated in the practice of the present invention are those prepared from a dibasic acid, such as terephthalic acid, and a glycol, such as ethylene glycol. The reaction takes place in two stages. In the first stage, the dibasic acid and glycol are mixed together and heated in the presence or absence of esterification catalysts, as desired. At least about one molecular proportion of the glycol per molecular proportion of dibasic acid are employed, and in many cases it is desirable to employ higher proportions of the glycol relative to the dibasic acid, for example, up to five moles of glycol per mole of dibasic acid, since the initial esterification takes place more readily as a result. Water is evolved during the first stage of reaction and is continuously removed, and an intermediate product is formed which is an hydroxyalkyl derivative of the dibasic acid. The intermediate product or reaction mass is then further heated which is known as the second stage. During the second stage, glycol is liberated and the melting point and viscosity of the reaction mixture gradually increases. Length of heating determines the molecular weight and when it is desirable to produce filaments from the polyester, the heating in the second stage is continued until the melt produced has cold-drawing properties. There is a means of approximating the desirable molecular weight of the polyester which can thereafter be wet-spun into filaments in accordance with the present invention.

Polyesters produced in accordance with the methods described and claimed in copending applications of George E. Ham, Serial Nos. 347,161 and 347,162, filed April 6, 1953, wherein an alkylene carbonate, such as ethylene carbonate, is employed to replace all or a portion of the glycol, may be employed in the practice of the present invention.

The polyester compositions described herein are particularly adapted for use in the manufacture of shaped articles, such as filaments, fibers, films, and the like by the wet-spinning process. In forming filaments, the polyester solution is extruded through a spinneret submerged in a liquid medium comprising an aliphatic alcohol or dioxane, said medium being a non-solvent for the said polyester. Thereafter, the filaments are removed from the liquid medium or coagulating bath, washed free of coagulant, stretched if desired, and dried, in conventional manner. If desired, the filaments can be cut into staple fibers using standard equipment, such as a Beria type cutter. In the case of forming filaments, an aqueous coagulating bath is preferred wherein the alcohol or dioxane, or like non-solvent, is employed in concentrations of 10 to 100%. Films may be formed in like manner by conventional procedures by extruding the polyester solution or dope through an elongated slot into a coagulating medium, as defined above. Further, films can be cast from the polyester solutions of the instant invention by casting a film on a continuous stainless steel belt or on a rotating wheel or drum having a smooth metal surface which in turn is immersed in a coagulating bath, as described above. The films may also be formed on the stainless steel belt or wheel by solvent evaporation and thereafter stripped from the casting support.

While in many instances it is desirable to heat the polyester in the solvent to effect complete solution in the shortest possible time, in order to avoid any discoloration due to prolonged heating, the solutions are stable at room temperature for prolonged periods.

Further details of the practice of this invention are set forth with respect to the following examples, which are merely intended to be illustrative and not limitative. In the examples, all parts and percent are by weight, unless otherwise indicated.

*Example I*

A mixture was formed containing 1.5 parts of polyethylene terephthalate, which had a melt viscosity of 10000 poises, and 8.5 parts of trichloroethanol. The mixture was warmed to a temperature of 80° C. with stirring. After 15 minutes a clear, homogeneous and viscous solution was obtained containing 15% polyethylene terephthalate. The solution was extruded, in conventional manner, into a bath of aqueous ethyl alcohol and a bath of aqueous dioxane. In each case, filaments were formed which were tough and pliable. The polyethylene terephthalate solution was also capable of being cast into films.

*Example II*

A mixture was prepared containing 2 parts of polytetramethylene terephthalate and 6 parts of trichloroethanol. The mixture was stirred and heated at 80° C. for a period of 30 minutes. At the end of this time, a clear, homogeneous solution was obtained which when extruded into water, in conventional manner, set-up rather slowly. However, when aqueous ethyl alcohol (50–50 by volume), or ethyl alcohol alone, were employed as the coagulating baths, the set-up rate was adequate to produce satisfactory filaments and films. The solution, or dope, obtained in accordance with this procedure was stable at room temperature for periods in excess of 4 hours.

*Example III*

A mixture of 10 parts of phenol and 10 parts of trichloroethanol was prepared and the mixture gently warmed to dissolve the phenol. To the clear solution thus obtained there was added 5 parts of polyethylene terephthalate. The mixture was stirred and heated at 50° C. for 30 minutes. A clear, homogeneous solution or dope was obtained which formed filaments and films when extruded as outlined in Examples I and II. The solution was stable at room temperature.

*Example IV*

A mixture of 10 parts of trichloroethanol and 10 parts of alpha-chloroacetic acid was prepared and the mixture warmed gently to effect solution. To this solvent solution there was added 4 parts of polyethylene terephthalate and the resultant mixture stirred and heated for 30 minutes at 60° C. The clear, homogeneous solution obtained was stable at room temperature and when extruded into water, aqueous alcohol, etc., as outlined in Examples I and II, satisfactory filaments and films were obtained.

*Example V*

In this example, a mixture of 2 parts of polyhydroxyquinine succinate and 16 parts of trichloroethanol was stirred and heated for 30 minutes at 80° C. A clear, homogeneous solution was obtained which was stable at room temperature. When this solution was extruded into coagulating baths, as described in the previous examples, satisfactory filaments and films were obtained.

When it is desirable to produce shaped articles from the polyester compositions of the instant invention which have a modified appearance or modified properties, various agents to accomplish these effects may be added to the polyester solutions prior to fabrication of the articles without any ill effects thereon. For example, various plasticizers, pigments, dyes, and the like may be added, as well as fire retarding agents, anti-static agents, etc.

The polyester compositions can be usefully employed in the coating field, for example, in the coating of textile fabrics. Thus, a fabric can be coated and/or impregnated with the polyester solutions described herein and then treated, e. g. soaked, in a non-solvent for the polyester in order to precipitate the polyester in and on the fabric. Metals, paper and impervious films may also be coated with the polymer compositions of this invention by conventional and well-known procedures.

Various other agents may be added to the instant polyester compositions, such as delusterants, waxes, oils, water-repellants, antioxidants, corrosion inhibitors, and the like, and particularly useful ingredients or agents for the purpose of increasing the stability of the polymer when exposed for long periods to sunlight or elevated temperatures are the various stabilizing agents.

One of the principal advantages of the instant invention is that it provides polyester compositions which are readily convertible to useful shaped articles by the wet-spinning method which is more economical than the dry-spinning or melt-spinning methods. Numerous other advantages of this invention will be apparent to those skilled in the art from reading the instant description.

As many apparently widely different embodiments of this invention may be made without departing from the spirit and scope thereof, it is to be understood that the same is not limited to the specific embodiments thereof except as defined in the appended claims.

I claim:

1. A new composition of matter comprising a solution of a synthetic linear condensation polyester formed by the reaction of a dicarboxylic acid and at least one glycol of the series $HO(CH_2)_nOH$, where $n$ is an integer greater than one and not exceeding 10, and a solvent selected from the group consisting of trichloroethanol and mixtures of trichloroethanol and a compound selected from the group consisting of phenol, m-cresol and halogen-substituted acids of the fatty acid series containing from 2 to 4 carbon atoms, said halogen being selected from the group consisting of chlorine and bromine.

2. A new composition of matter as defined in claim 1 wherein the polyester is polyethylene terephthalate.

3. A new composition of matter as defined in claim 1 wherein the solvent is a mixture of trichloroethanol and phenol.

4. A new composition of matter as defined in claim 1 wherein the solvent is a mixture of trichloroethanol and m-cresol.

5. A new composition of matter as defined in claim 1 wherein the solvent is a mixture of trichloroethanol and alpha-chloroacetic acid.

6. A new composition of matter as defined in claim 1 wherein the solvent is a mixture of trichloroethanol and alpha-bromoacetic acid.

7. A new composition of matter as defined in claim 1 wherein the solvent is trichloroethanol.

8. A new composition of matter as defined in claim 7 wherein the polyester is polyethylene terephthalate.

9. A new fiber-forming composition comprising a homogeneous solution of 5 to 30% polyethylene terephthalate having a molecular weight of at least 10,000 and trichloroethanol.

10. A process for preparing a new composition of matter comprising mixing a synthetic linear condensation polyester formed by the reaction of a dicarboxylic acid and at least one glycol of the series $HO(CH_2)_nOH$, where $n$ is an integer greater than one and not exceeding 10, with a solvent selected from the group consisting of trichloroethanol and mixtures of trichloroethanol and a compound selected from the group consisting of phenol, m-cresol and halogen-substituted acids of the fatty acid series containing from 2 to 4 carbon atoms, said halogen being selected from the group consisting of chlorine and bromine, and heating said mixture to a temperature in the range of 25° C. to the boiling point of the solvent.

11. The process as defined in claim 10 wherein the polyester is polyethylene terephthalate.

12. The process as defined in claim 11 wherein the solvent is trichloroethanol.

13. A process for preparing a new composition of matter comprising mixing polyethylene terephthalate and a solvent selected from the group consisting of trichloroethanol and mixtures of 50 to 98% trichloroethanol, based on the total weight of solvent, and 2 to 50% of a compound selected from the group consisting of phenol, m-cresol and halogen-substituted acids of the fatty acid series containing from 2 to 4 carbon atoms, said halogen being selected from the group consisting of chlorine and bromine, and heating said mixture to a temperature in the range of 25° C. to the boiling point of the solvent while agitating the mixture.

14. A process for preparing a homogeneous fiber-forming solution which comprises mixing polyethylene terephthalate having a molecular weight of at least 10,000 with trichloroethanol and heating said mixture at a temperature in the range of 25° C. to 151° C. while agitating the mixture, said polyethylene terephthalate being employed in an amount to give 5 to 30% by weight in the finished solution.

References Cited in the file of this patent

UNITED STATES PATENTS 2,743,250 Sweet _____ Apr. 24, 1956

FOREIGN PATENTS 609,947 Great Britain _____ Oct. 8, 1948

OTHER REFERENCES

Durrans: Solvents (1950), page 167.

UNITED STATES PATENT OFFICE
CERTIFICATE OF CORRECTION

Patent No. 2,861,970 November 25, 1958

Hobson D. De Witt

It is hereby certified that error appears in the printed specification of the above numbered patent requiring correction and that the said Letters Patent should read as corrected below.

Column 4, line 11, for "10000 poises" read -- 1000 poises --.

Signed and sealed this 10th day of March 1959.

(SEAL)
Attest:

KARL H. AXLINE
Attesting Officer

ROBERT C. WATSON
Commissioner of Patents